United States Patent
Dai et al.

(10) Patent No.: US 7,606,974 B2
(45) Date of Patent: Oct. 20, 2009

(54) AUTOMATIC CACHING GENERATION IN NETWORK APPLICATIONS

(75) Inventors: Jinquan Dai, Shanghai (CN); Luddy Harrison, Chestnut, MA (US); Long Li, Shanghai (CN); Bo Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 10/589,398

(22) PCT Filed: May 26, 2004

(86) PCT No.: PCT/CN2004/000538

§ 371 (c)(1),
(2), (4) Date: Aug. 14, 2006

(87) PCT Pub. No.: WO2005/116837

PCT Pub. Date: Dec. 8, 2005

(65) Prior Publication Data

US 2007/0198772 A1     Aug. 23, 2007

(51) Int. Cl.
G06F 12/02 (2006.01)

(52) U.S. Cl. .................. 711/118; 711/128; 711/155; 712/220; 712/225

(58) Field of Classification Search ............... 711/118, 711/128, 155; 712/220–221, 225–226
See application file for complete search history.

(56) References Cited

U.S. PATENT DOCUMENTS

| 5,933,627 | A | 8/1999 | Parady |
| 7,085,889 | B2 * | 8/2006 | Hammarlund et al. ...... 711/130 |
| 2003/0163648 | A1 | 8/2003 | Smith |

FOREIGN PATENT DOCUMENTS

| JP | 2002-163121 A | 6/2002 |
| WO | WO 03/102781 | 12/2003 |

* cited by examiner

Primary Examiner—Jasmine Song
(74) Attorney, Agent, or Firm—Blakely, Sokoloff, Taylor & Zafman LLP

(57) ABSTRACT

Automatic software controlled caching generations in network applications are described herein. In one embodiment, a candidate representing a plurality of instructions of a plurality of threads that perform one or more external memory accesses is identified, where the external memory accesses have a substantially identical base address. One or more directives and/or instructions are inserted into an instruction stream corresponding to the identified candidate to maintain contents of at least one of a content addressable memory (CAM) and local memory (LM) of a processor, and to modify at least one of the external memory access to access at least one of the CAM and LM of the processor without having to perform the respective external memory access. Other methods and apparatuses are also described.

21 Claims, 19 Drawing Sheets

```
CAM lookup for base
if (lookup miss)
{
    n = the LRU entry in CAM;
    addr = the value contained in the LRU entry in CAM;
    if (addr is valid)
    {
        write the data image in LM (from B + n* (M-m+1) to
        B + (n+1)* (M-m+1) -1) back to external memory
        (from addr + m to addr + M);
    }
    write base to the nth entry in the CAM;
    load external memory (from base + m to base + M )
    to LM (from B + n* (M-m+1) to B + (n+1)* (M-m+1) -1);
}
else
{
    n = the associated entry in CAM containing base;
}
```

Fig. 17

AUTOMATIC CACHING GENERATION IN NETWORK APPLICATIONS

CROSS-REFERENCE TO RELATED APPLICATION

This application is a National Phase application of, and claims priority to, International Application No. PCT/CN2004/000538, filed May 26, 2004, entitled AUTOMATIC CACHING GENERATION IN NETWORK APPLICATIONS

FIELD OF THE INVENTION

Embodiments of the invention relate to network applications; and more specifically, to automatic cache generation for network applications.

BACKGROUND OF THE INVENTION

Network processors (NP) are emerging as a core element of high-speed communication routers and they are designed specifically for packet processing applications. Such applications usually have stringent performance requirements. For instance, OC-192 (10 Gigabits/sec) POS (Packet over SONET) packet processing requires a throughput of 28 million packets per second or service time of 4.57 microseconds per packet for transmission and receipt in the worst case.

On the other hand, the latency for an external memory access in NPs is usually larger than the worst-case service time. In order to address the unique challenge of packet processing, (e.g., maintaining stability while maximizing throughput and minimizing latency for the worst-case traffic,) modern network processors usually have a highly parallel architecture. For instance, some network processors, such as, Intel IXA NPU family of network processors (IXP), includes multiple microengines (e.g., programmable processors with packet processing capability) running in parallel and each microengine supports multiple hardware threads.

Consequently, the associated network applications are also highly parallel and usually multi-threaded to compensate the long memory access latency. Whenever a new packet arrives, a series of tasks (e.g., receipt of the packet, routing table look-up, and enqueueing) is performed on that packet by a new thread. In such a parallel programming paradigm, modifications to global resources, such as a location in the shared memory, are protected by critical sections to ensure mutual exclusiveness and synchronization between threads.

Each critical section typically reads a resource, modifies it, and writes it back (RMW). FIG. 1 is a block diagram illustrating a conventional external memory accesses by multiple threads. As shown in FIG. 1, if more that one thread is required to modify the same critical data, a latency penalty will be incurred for each thread if each accesses the external memory. Referring to FIG. 1, each of the threads 101-104 has to be executed in sequence. For example, thread 102 has to wait thread 101 to finish the operations read, modification, and write back to the external memory before thread 102 can access the same location of the external memory.

BRIEF DESCRIPTION OF THE DRAWINGS

The invention may best be understood by referring to the following description and accompanying drawings that are used to illustrate embodiments of the invention. In the drawings:

FIG. 17 is a block diagram of an example of pseudo code for the process example of FIG. 16.

DETAILED DESCRIPTION

Figure 1:
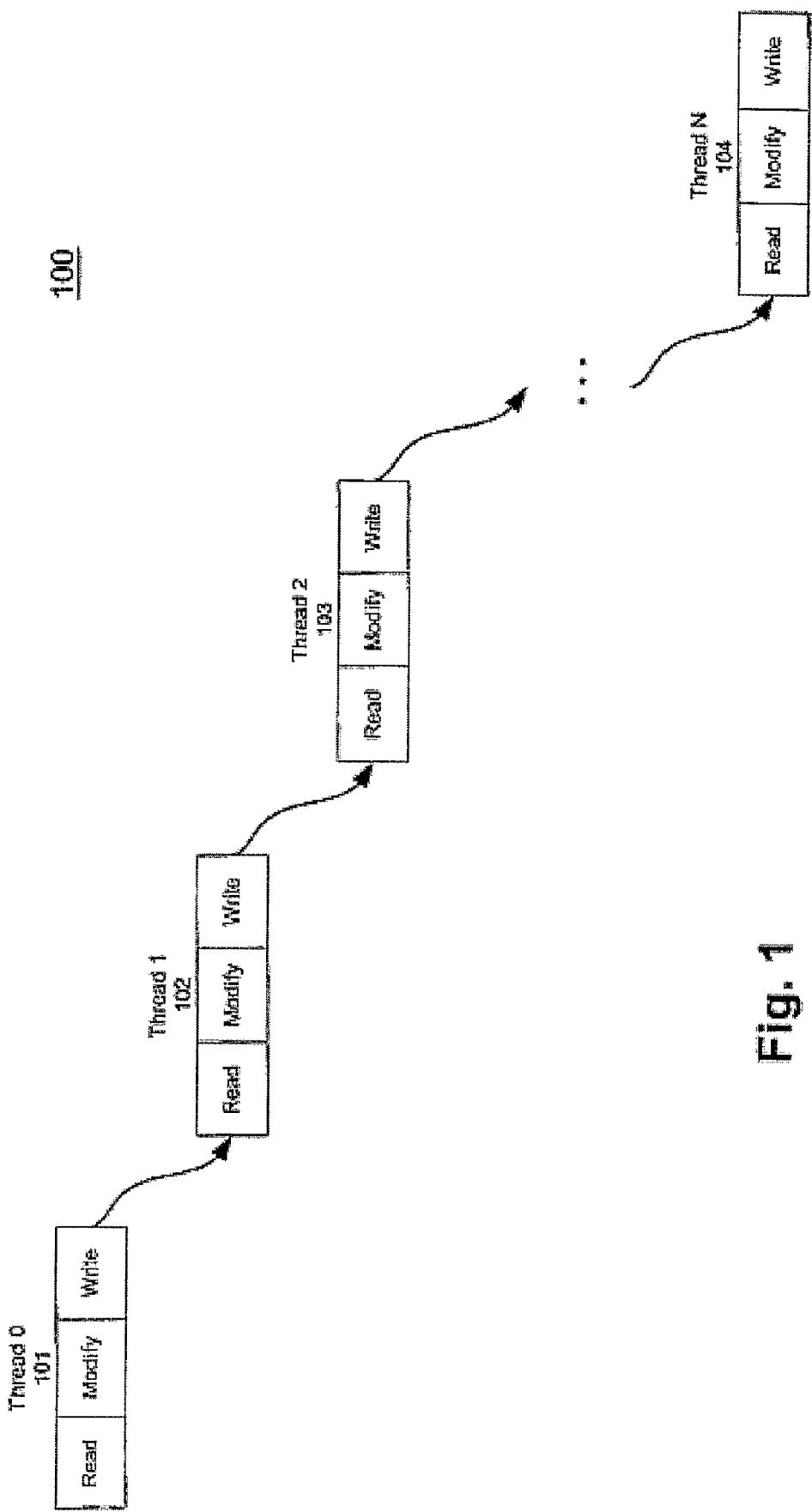
FIG. 1 is block diagram illustrating a typical external memory access.

Automatic software controlled caching generations in network applications are described herein. In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In one embodiment, Software controlled caching can be used to help reduce the latency penalty, by folding the multiple RMW operations into a single read and one or more modifications. Consequently, the number of external memory accesses is significantly reduced, and the latency caused by the inter-thread dependence (around the critical data) is effectively minimized.

Figure 2:
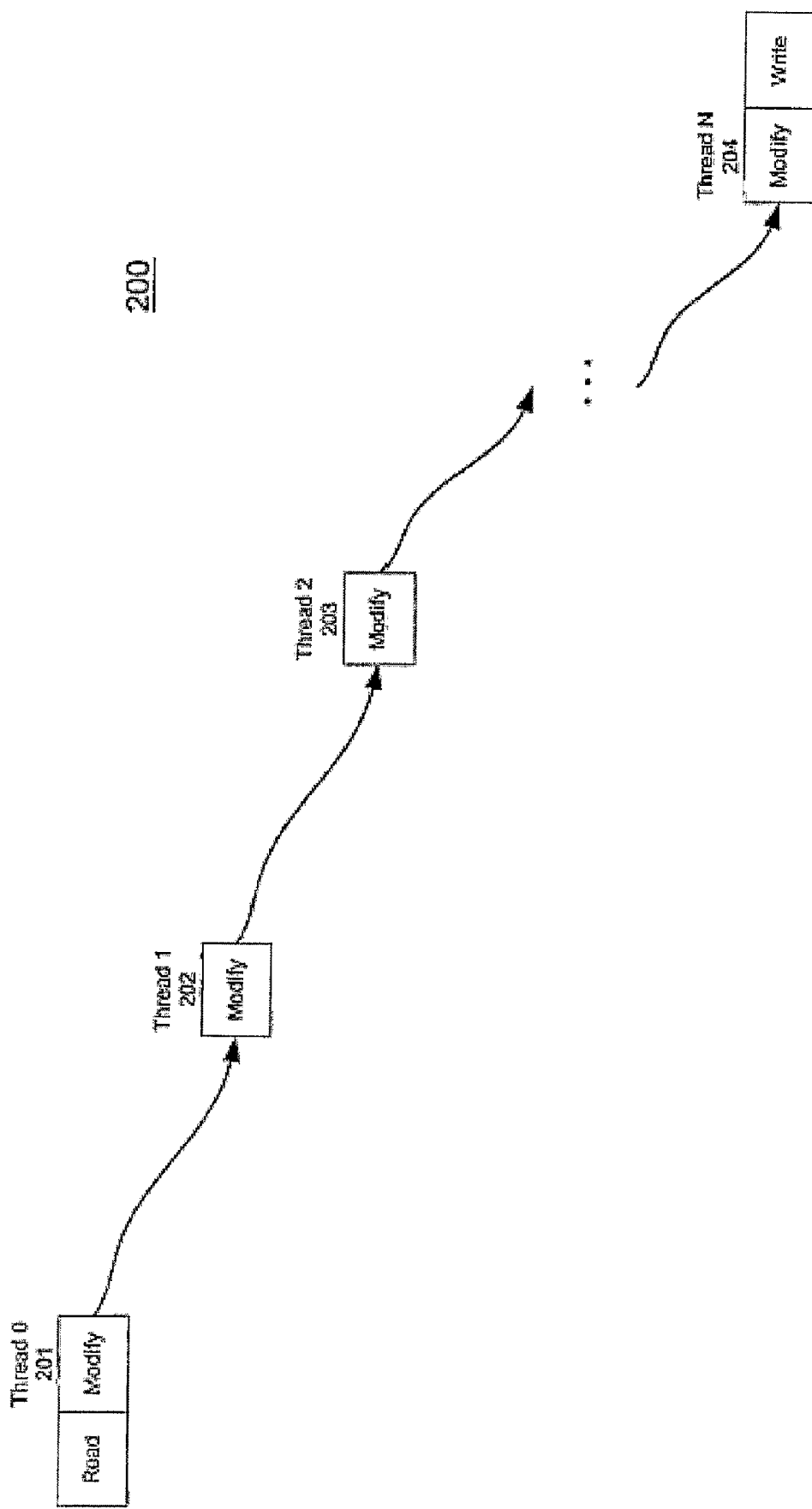
FIG. 2 is a block diagram illustrating an example of an external memory access using software controlled caching according to one embodiment.

FIG. 2 is a block diagram illustrating an example of external memory accesses by multiple threads, according to one embodiment. The external memory access example 200 includes multiple threads including threads 201-204. Similar to memory accesses shown in FIG. 1, each thread includes a read operation, a modification operation, and a write operation, also referred to as RMW operations. In one embodiment, the RMW operations of threads 201-204 are merged or folded into a single read operation, one or more modification operations, a single write operation at the end, using a caching mechanism, which will be described in details further below. As a result, the number of external memory accesses is significantly reduced, and the latency caused by the inter-thread dependence is greatly reduced.

Figure 3:
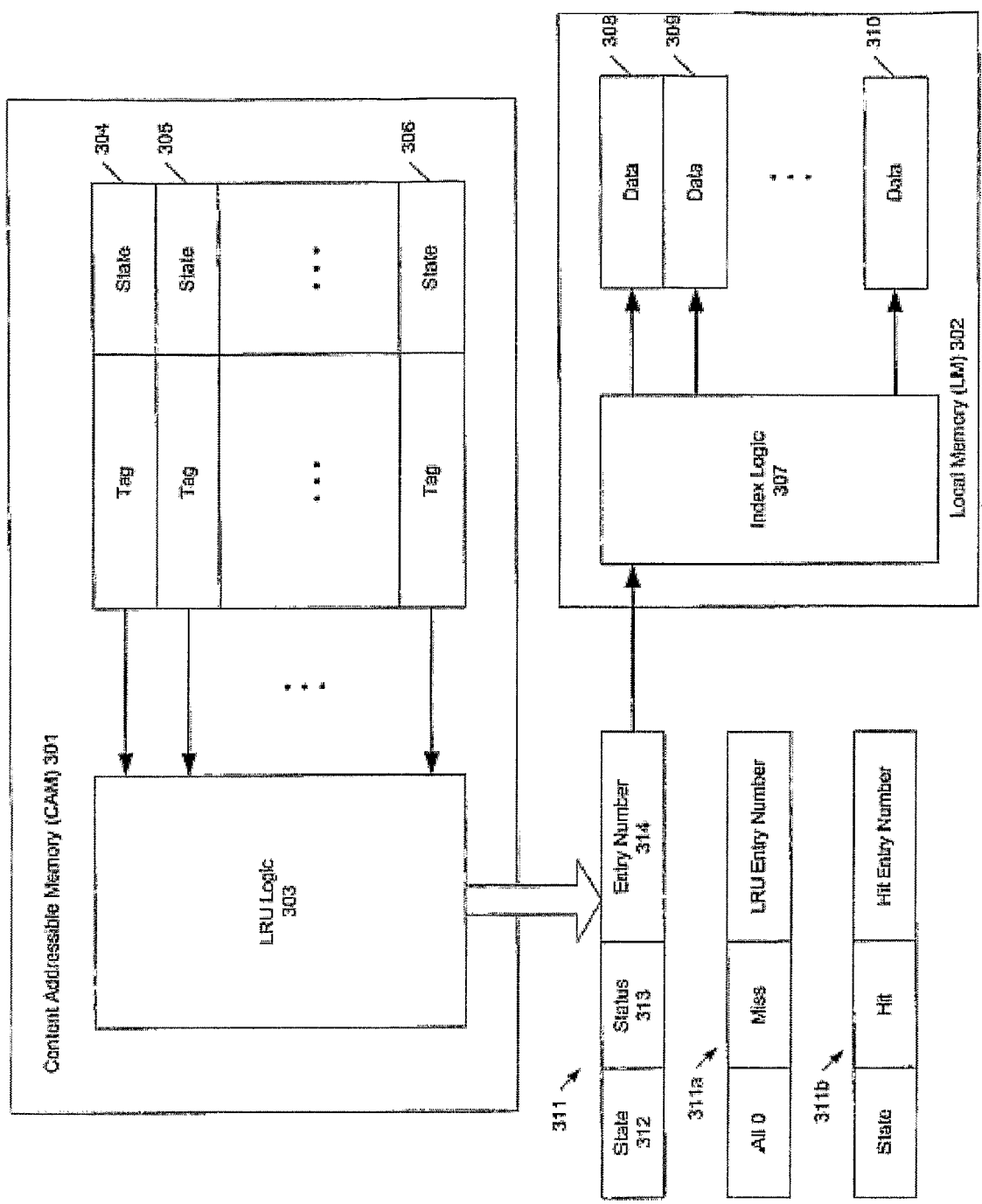
FIG. 3 is a block diagram illustrating an example of a caching mechanism according to one embodiment.

FIG. 3 is a block diagram illustrating an example of a caching mechanism according to one embodiment. In one embodiment, the caching mechanism 300 may be implemented within a microengine of a processor having multiple microengines, such as, for example, Intel IXA NPU family of network processors (IXP).

For example, according to one embodiment, in each microengine of a processor having multiple microengines, such as, Intel IXA NPU family of network processors (IXP), a content addressable memory (CAM) unit and local memory (LM) may be combined to implement the software controlled caching. The CAM unit in a microengine is the content addressable memory. Each of the entries in the CAM unit stores the state and tag portion of a cache line and its least recently used (LRU) logic maintains a time-ordered list of CAM entry usage. In addition, the local memory in a microengine is basically an indexed register file, in which the data portion of cache lines can be stored. All the related cache operations (e.g., lookup for the tag, load of the data, write back of the data, etc.) are under software control.

In one embodiment, a processor includes, but not limited to, multiple microengines having a content addressable memory (CAM) and a local memory respectively to perform multiple threads substantially concurrently, each of the threads including one or more instructions performing at least one external memory access based on a base address that is substantially identical, where the base address is examined in the CAM to determine whether the CAM includes an entry containing the base address, and an entry of the local memory corresponding to the entry of the CAM is accessed without having to accessing the external memory, if the CAM includes the entry containing the base address.

Referring to FIG. 3, in one embodiment, the caching mechanism example 300 includes, but not limited to, a CAM 301 and a LM 302. Although, the caching mechanism example 300 illustrates one CAM and one LM, it will be appreciated that more than one CAM and LM may be implemented. The Cam 301 and LM 302 may be used, in combination, to automatically implement software controlled caching to reduce the latency penalty of accessing external memory in network applications. For the purposes of illustrations, the CAM and LM units are used as an example to illustrate the program transformation throughout the present application. However, it will be appreciated that other types of memory and mechanisms may also be implemented without departing broader scope and spirit of embodiments of the invention.

In one embodiment, CAM 301 includes one or more entries 304-306, where each of the entries 304-306 includes a tag field and a state field to store the tag portion and the state portion of a cache line respectively. In addition, CAM 301 further includes a least recently used (LRU) logic to determine the least recently used entry of CAM 301. In one embodiment, LM 302 includes one or more entries 308-310, where each of the entries 308-310 is used to store a data portion of a cache line.

In one embodiment, when a request for accessing location having a base address of an external memory is received, the microengine that handles the thread of the request may examine (e.g., walking through) the CAM 301 to locate an entry having the requested base address. For example, each of the entries 304-306 of CAM 301 may be examined to match the requested base address of the external memory. Typically, the entries 304-306 of CAM 301 may store the base addresses of recently accessed external memory. If the entry having the requested base address is found in CAM 301, LRU logic 303 returns a result 311 having state field 312, status field 313, and entry number field 314. The state field 312 may contains the state of the corresponding cache line and/or the state of CAM, and status field 313 indicating whether the cache is a hit (result 311b) or a miss (result 311a). The entry number field 314 contains the hit entry number of the CAM 301 that contains the requested base address. The hit entry number may be used to access an entry of LM 302 according to a predetermined algorithm, which will be described in details further below, via index logic 307 of LM 302.

If it is determined that the CAM 301 does not contains the requested base address, LRU logic 303 returns a least recently used entry of CAM 301 (e.g., result 311a). The least recently used entry of the CAM is linked to an entry of LM 302 that may be used to store (e.g., caching) the data from the external memory access for subsequent external memory accesses to the same base address.

Figure 4:
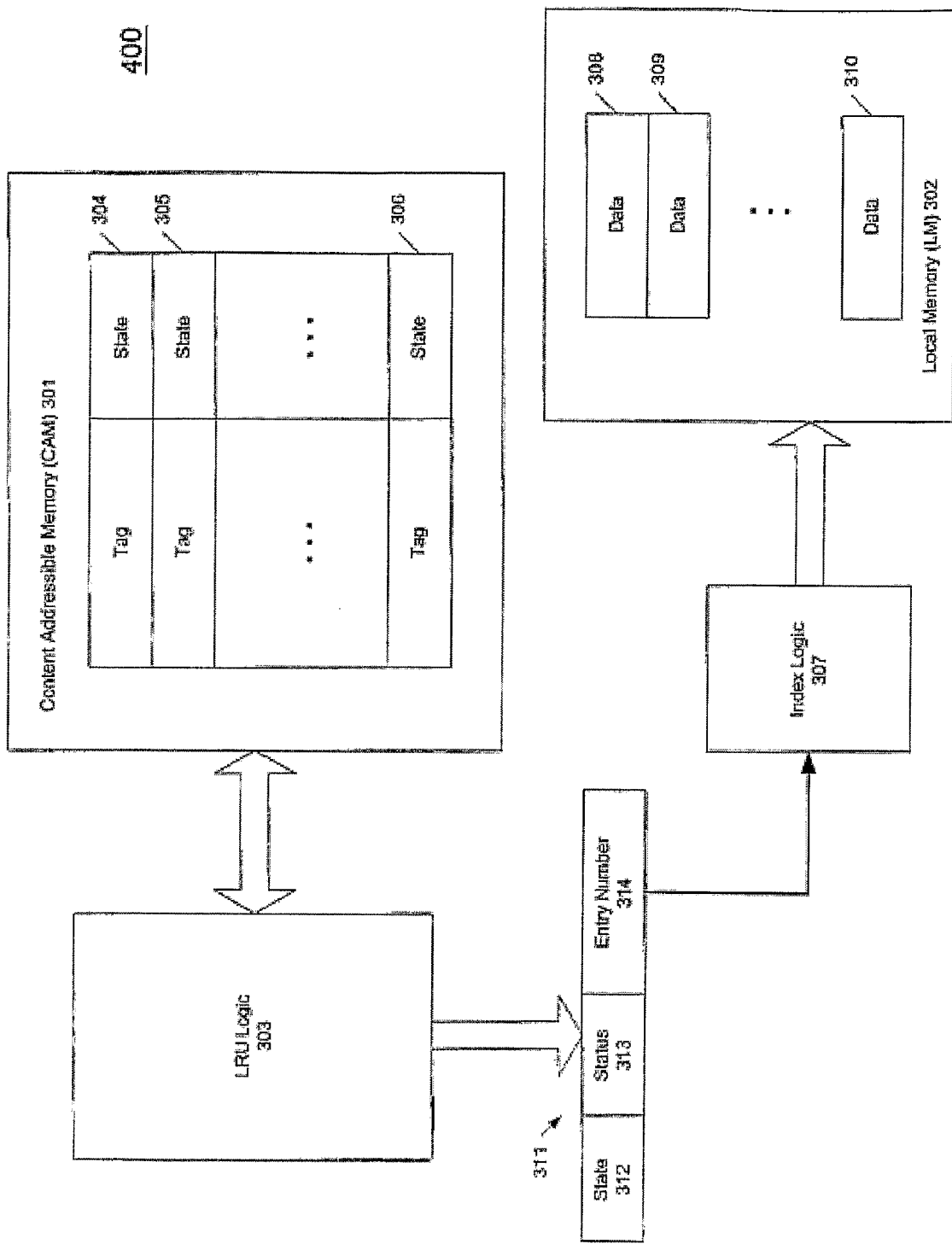
FIG. 4 is a block diagram illustrating an example of a caching mechanism according to an alternative embodiment.

The LRU logic 303 may be implemented as a part of CAM 301 and/or index logic may be implemented as a part of LM 302. However, the configurations may not be limited to the one shown in FIG. 3. It will be appreciated that other configurations may exist. For example, according to an alternative embodiment, the LRU logic 303 may be implemented external to CAM 301 and/or the index logic 307 may be implemented external to LM 302, as caching mechanism example 400 shown in FIG. 4. Further, the CAM 301 and/or LM 302 may be implemented as a part of a global CAM and/or LM that are shared among multiple microengines of a processor, where the global CAM and/or LM may be partitioned into multiple partitions for multiple microengines. Other configurations may exist.

Figure 5:
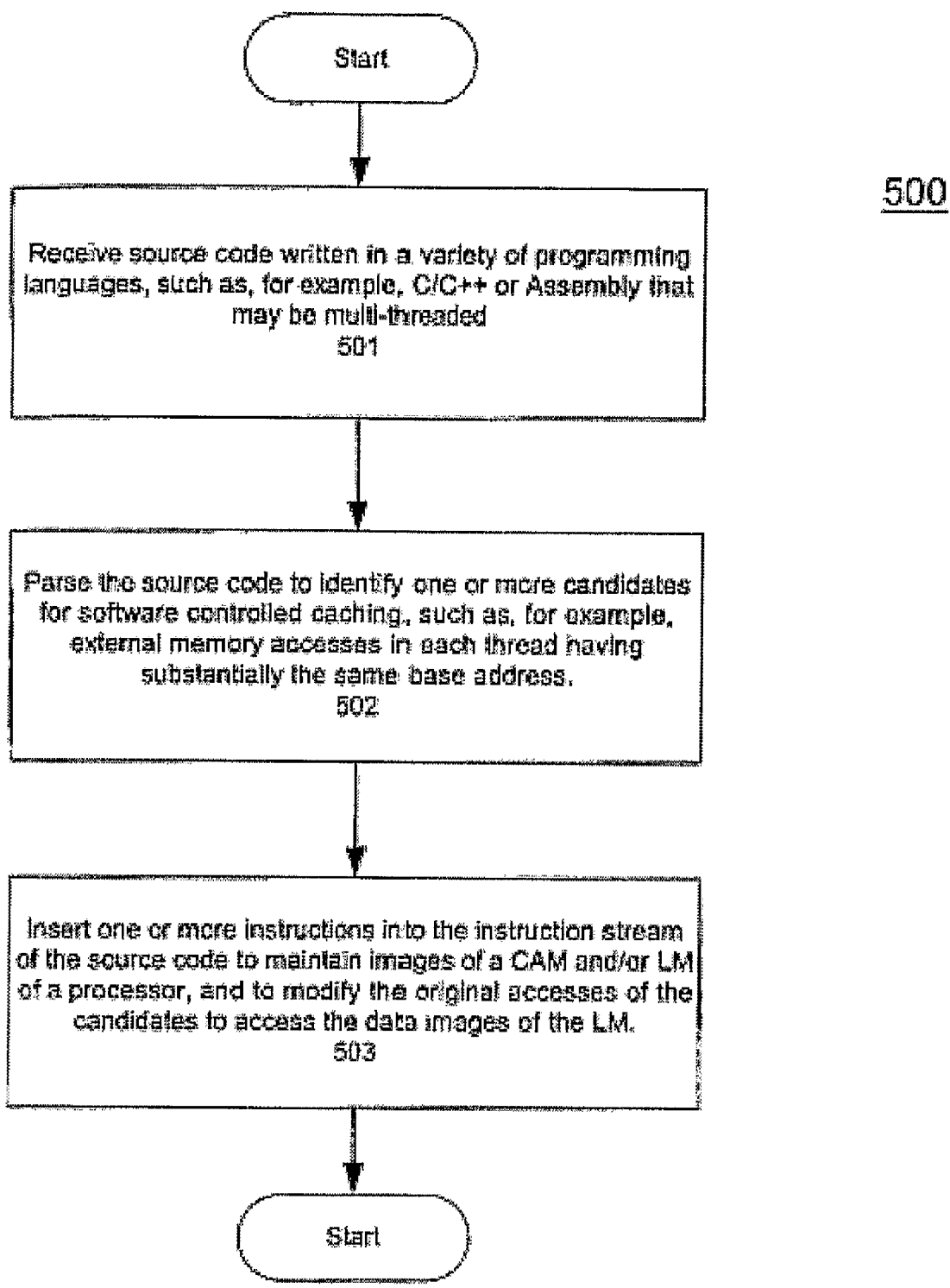
FIG. 5 is a flow diagram illustrating an example of a process for software automatic controlled caching, according to one embodiment.

FIG. 5 is a flow diagram illustrating an example of a process for software automatic controlled caching, according to one embodiment. Exemplary process 500 may be performed by a processing logic that may comprise hardware (circuitry, dedicated logic, etc.), software (such as is run on a dedicated machine), or a combination of both. For example, process example 500 may be performed by a compiler when compiling source code written in a variety of programming languages, such as, for example, C/C++ and/or assembly. In one embodiment, process example includes, but not limited to, identifying a candidate representing a plurality of instructions of a plurality of threads that perform one or more external memory accesses, the external memory accesses having a substantially identical base address, and inserting one or more directives or instructions into an instruction stream corresponding to the identified candidate to maintain contents of at least one of a content addressable memory (CAM) and local memory (LM) of a processor and to modify at least one of the external memory access to access at least one of the CAM and LM of the processor without having to perform the respective external memory access.

Referring to FIG. 5, at block 501, processing logic receives source code written in a variety of programming languages, such as, for example, C/C++ and/or assembly. At block 502, the processing logic parses the source code to identify one or more candidates for software controlled cache, such as, for example, external memory accesses in each thread having substantially identical base address. At block 503, the processing logic inserts one or more instructions into the instructions steam of the source code to maintain images of a CAM and/or LM of a microengine of a processor, and to modify the original external memory access of the candidates to access the data images of the LM without having to access the external memory. Other operations may also be performed.

In one embodiment, after the network application is multi-threaded, either manually or automatically through a parallelizing compiler, each thread performs essentially the same operations on a newly received packet, and modifications to global resources (e.g., external memory accesses) are protected by critical sections. This transformation automatically recognizes the candidate (external memory accesses in each thread) for caching, and implements the software controlled caching (e.g., maintaining the CAM and LM images, and modifying the original accesses to access the data image in LM).

Figure 6:
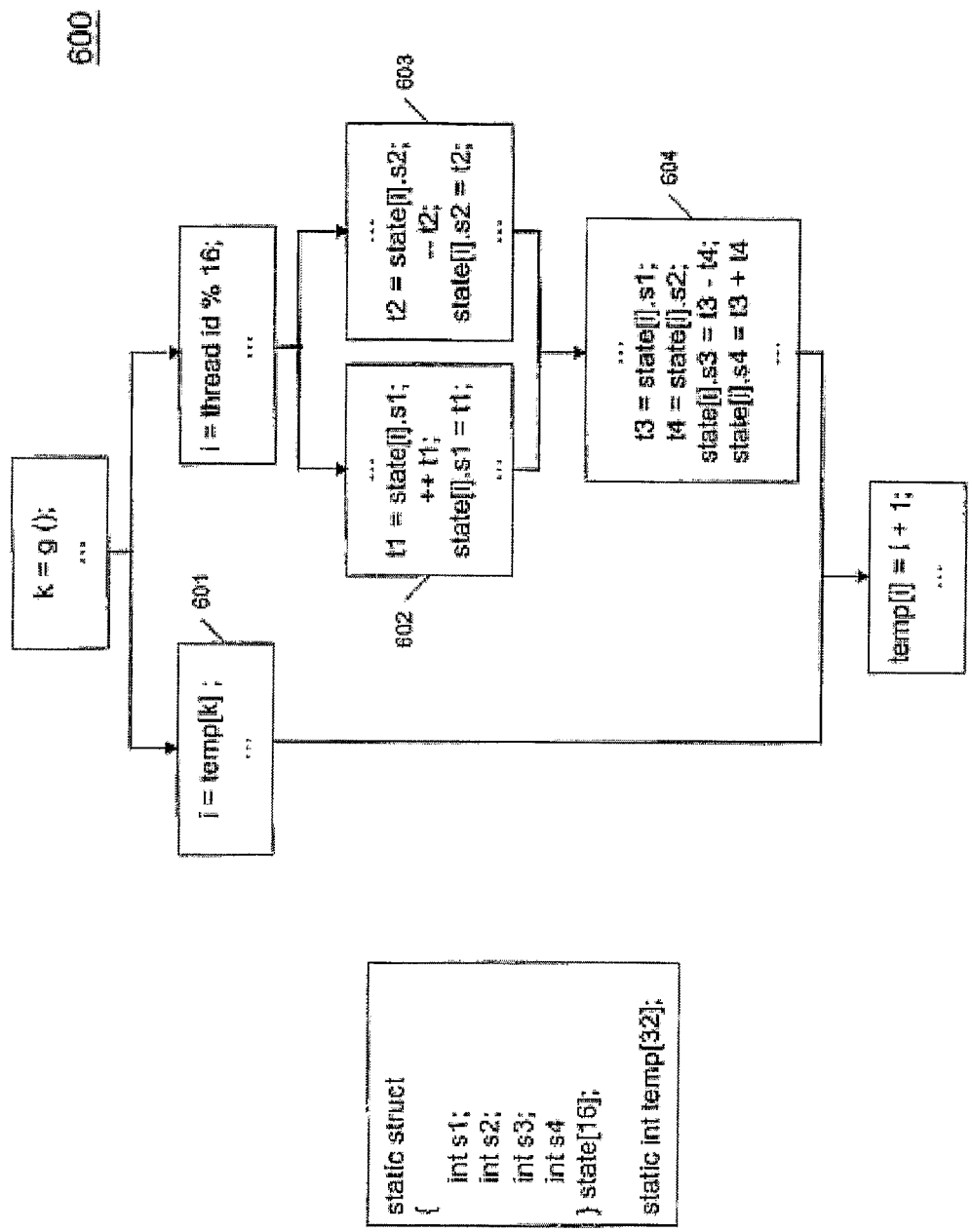
FIGS. 6-8 are block diagrams of examples of pseudo code illustrating software controlled caching operations according to one embodiment.

In order to provide a candidate for software controlled caching, the candidate has to be identified out of multiple potential candidates based on an analysis of the corresponding source code. FIG. 6 is an example of a source code, which may be used to provide candidates for software controlled caching according to one embodiment. Referring to FIG. 6, source code example 600 includes multiple operation blocks 601-604 that may be processed via multi-threading processes.

Figure 7:
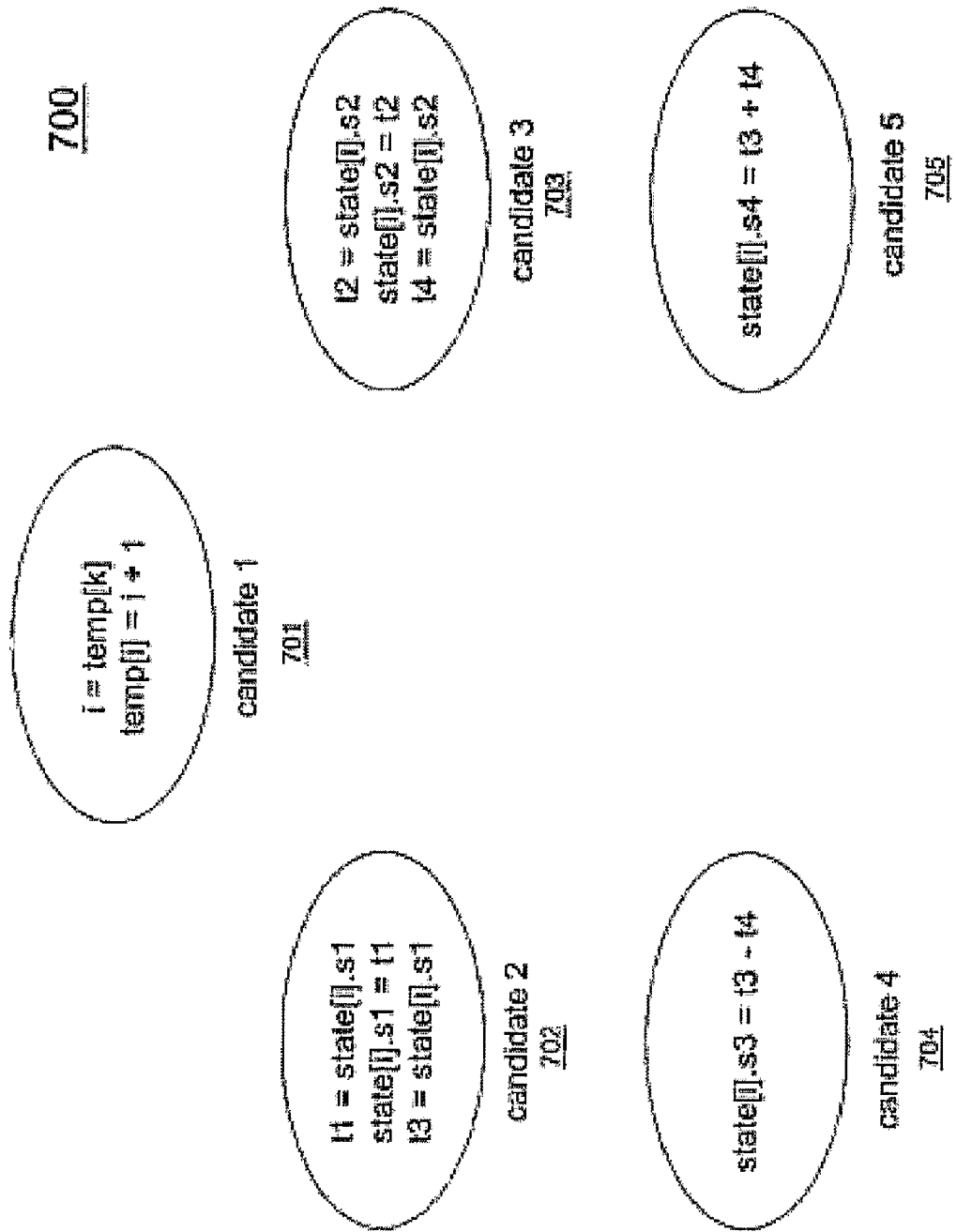

In one embodiment, source code example 600 may be analyzed to generate a pool of potential candidates, as shown in FIG. 7. Referring to FIG. 7, in this example, the pool of potential candidates 700 include candidates 701-705. In one embodiment, candidates 701-705 may be analyzed to identify a closed set of accesses the external memory via the same base address. That is, they access addresses (base+offset), where base is common to all the accesses in the set and may be different for different threads, and offset is a constant. This set is closed in the sense that it contains all accesses in the thread that are in a dependence relation with each other.

Figure 8:
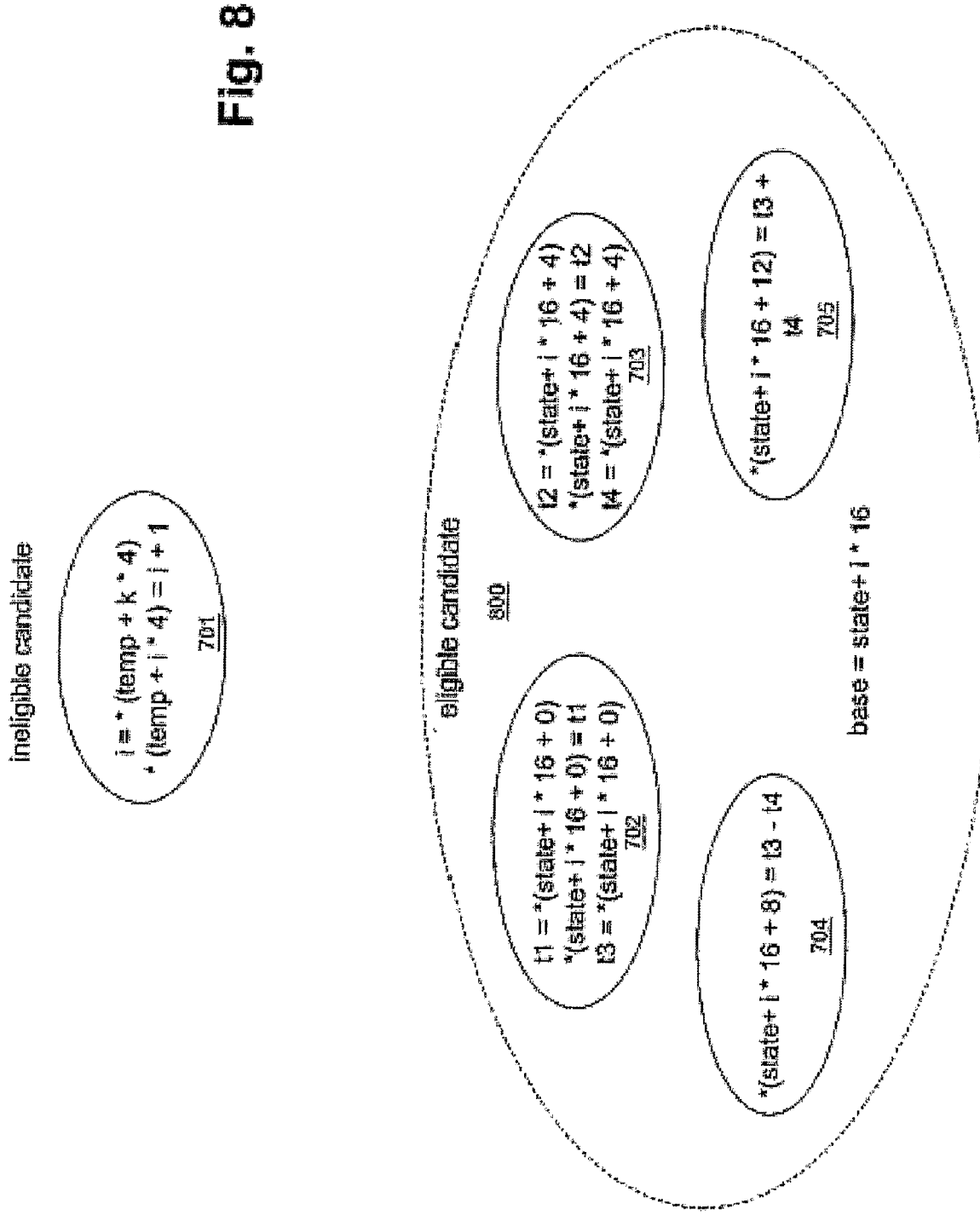

As a result, as shown in FIG. 8 according to one embodiment, any ineligible candidates may be screened out and one or more eligible candidates may be merged into a larger candidate based on their identical base address. In one embodiment, a candidate is ineligible for caching if the base is not common to all the accesses in the candidate. Alternatively, if the memory locations accessed by a candidate can be accessed by other programs, the respective candidate is ineligible. In this example, candidate 701 is an ineligible candidate since candidate 701 has a different base address. On the other hand, candidates 702-705 are eligible candidates because they have the identical base address (e.g., state+16*i) and thus, candidates 702-705 are merged into a single larger candidate 800 as a final candidate for caching.

Figure 9:
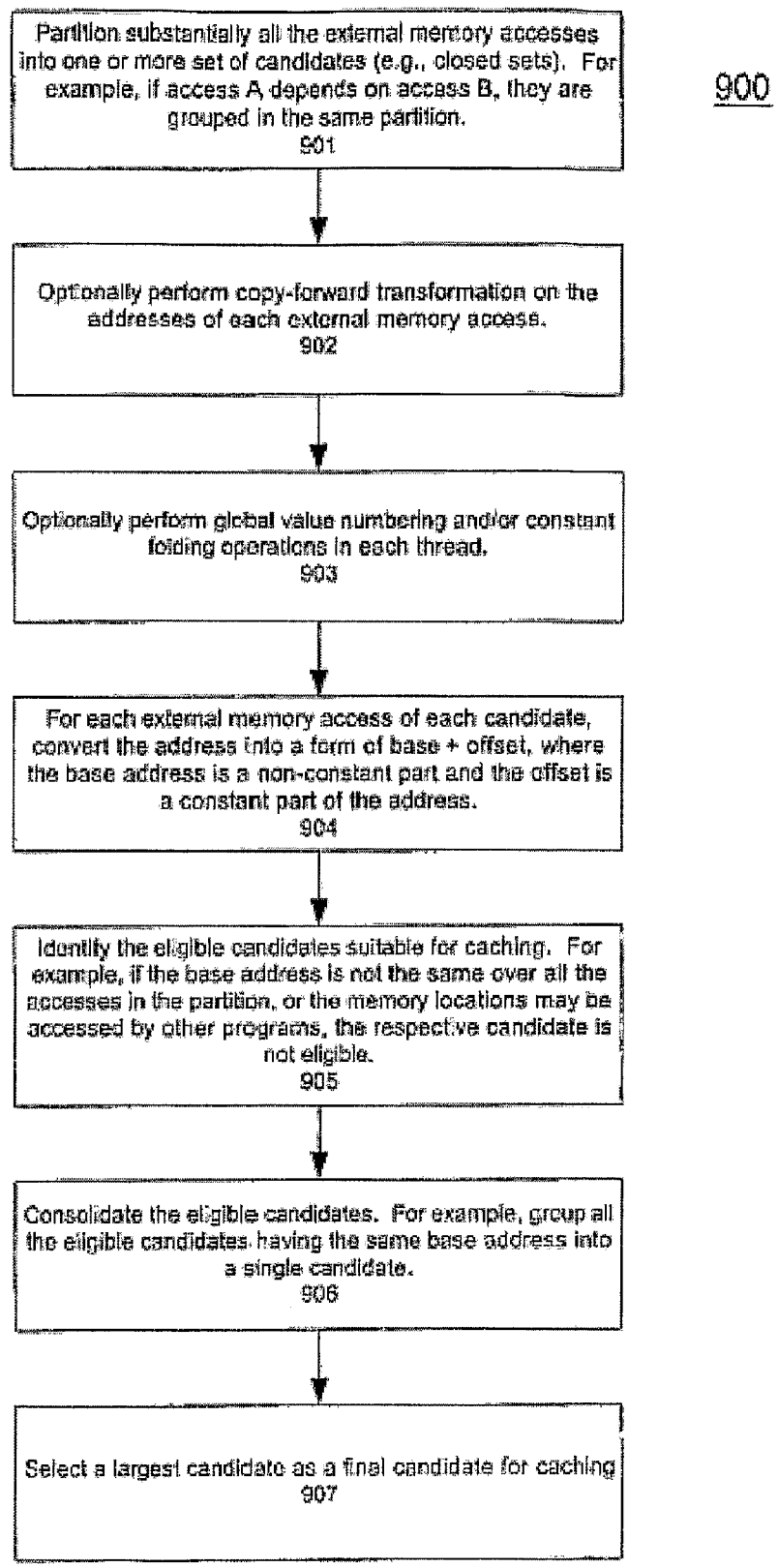
FIG. 9 is a flow diagram illustrating an example of a process to identify a candidate for caching according to one embodiment.

FIG. 9 is a flow diagram illustrating an example of a process to identify a candidate for caching according to one embodiment. The process example 900 may be performed by a processing logic that may comprise hardware (circuitry, dedicated logic, etc.), software (such as is run on a dedicated machine), or a combination of both. For example, process example 900 may be performed by a compiler when compiling source code written in a variety of programming languages, such as, for example, C/C++ and/or assembly.

Referring to FIG. 9, at block 901, the processing logic partitions substantially all of the external memory accesses into one or more set of candidates (e.g., closed sets). For example, if access A depends on access B, they may be grouped in the same partition. That is, if two accesses are in a dependence relation, they should access the same data image (either in the external memory or in the local memory). Hence each closed set identified is a candidate for caching.

At block 902, one or more copy-forward transformations may be optionally performed on the addresses of each external memory access. For example, the following operations:

$$a=b+c;$$
$$d=\text{load }[a];$$

may be transformed into the following operation:

$$d=\text{load}[b+c]$$

At block 903, one or more global value numbering and/or constant folding operations may be performed for each thread. For example, during a global value numbering operation, the following operations:

$$a=2;$$
$$b=c*a;$$
$$d=2;$$
$$e=d*c;$$

may be transformed into the following operations:

$$a=2;$$
$$b=c*a;$$
$$a=2;$$
$$b=c*a;$$

For example, during a constant folding operation, the following operations:

$$a=2;$$
$$b=c+d;$$
$$e=a+b;$$

may be transformed into the following operations:

$$a=2;$$
$$b=c+d;$$
$$e=2+b;$$

At block 904, for each external memory access of each candidate, the address of the external memory access is converted into a form of (base+offset). In one embodiment, the base address is a non-constant part and the offset is a constant part of the address. Note that if a program has been value numbered in the sense that identical addresses are made to have identical representations, the effectiveness of the transformation will be improved.

At block 905, one or more eligible candidates, such as, for example, candidates 702-705 of FIG. 7, are identified, while the ineligible candidates are screened out (e.g., eliminated). In one embodiment, if the base address is not identical over substantially all the external memory accesses in the partition, the corresponding candidate or candidates are considered as ineligible. Further, if the memory locations of the external memory accesses may be accessed by other programs, the corresponding candidate or candidates may be considered as ineligible. That is, if the memory addresses being accessed are known to other programs, such as, for example, externally defined, they are not suitable for caching. Such candidate or candidates may be identified via an escape analysis performed by a compiler.

At block 906, the eligible candidates may be consolidated into a single large candidate. For example, according to one embodiment, all of the eligible candidates having the identical base address may be grouped into a single candidate, such as candidate 800 of FIG. 8. At block 907, a candidate having largest candidates grouped is selected as a final candidate for caching. Other operations may also be performed.

Note that the software controlled caching is used to reduce the latency penalty of modifications to global resources by multiple threads. However, if the CAM and LM units are global resources shared by multiple threads, all the caching operations should be protected by a critical section. According to one embodiment, in order to simplify the synchronization needed for the critical section, only one candidate (e.g., one global resource) is selected. However, it will be appreciated that more than one candidate may be selected dependent upon a particular system design, as long as the critical section is handled appropriately.

Figure 10:
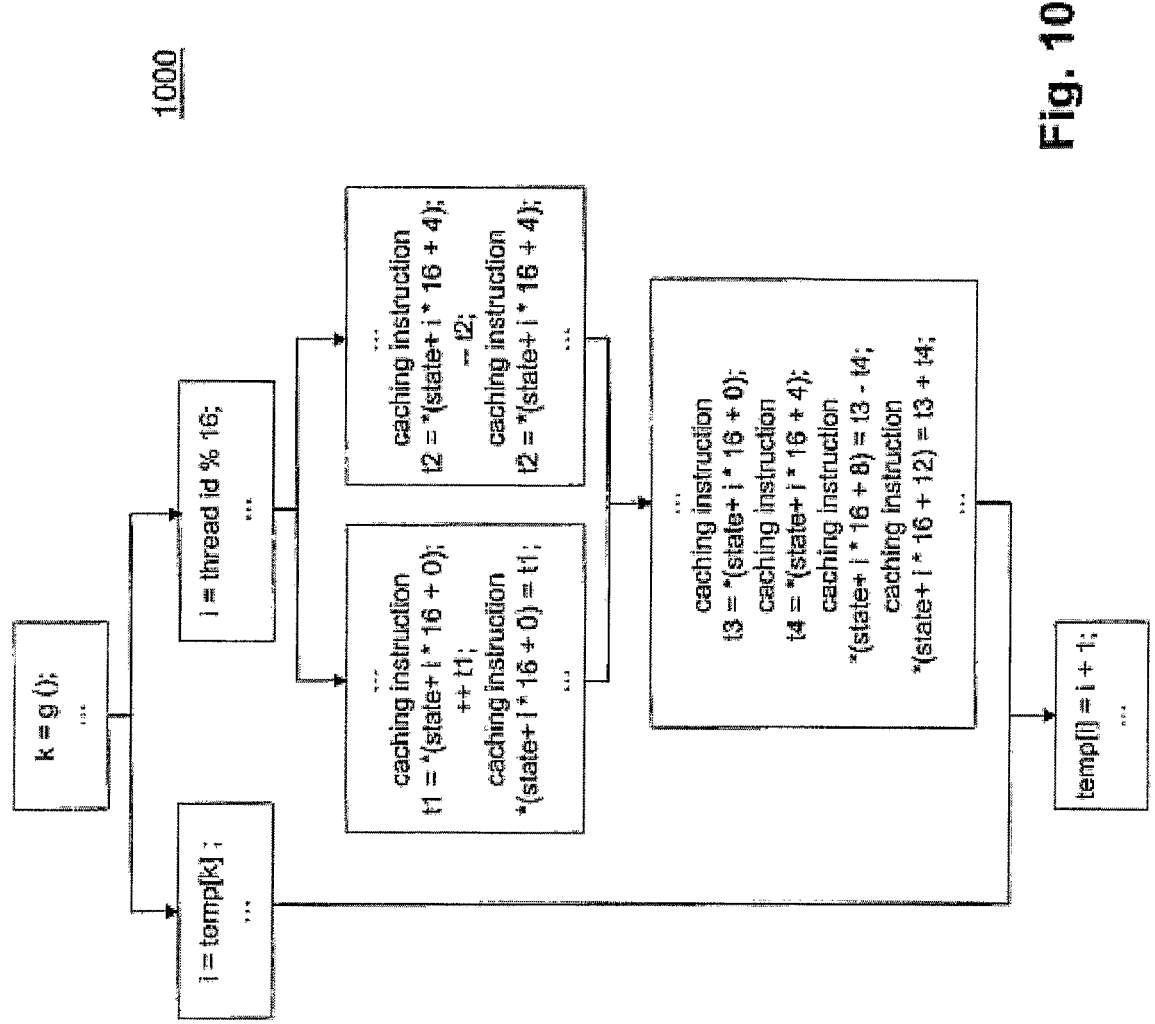
FIGS. 10-12 are block diagrams of examples of pseudo code illustrating software controlled caching operations according to one embodiment.
Figure 11:
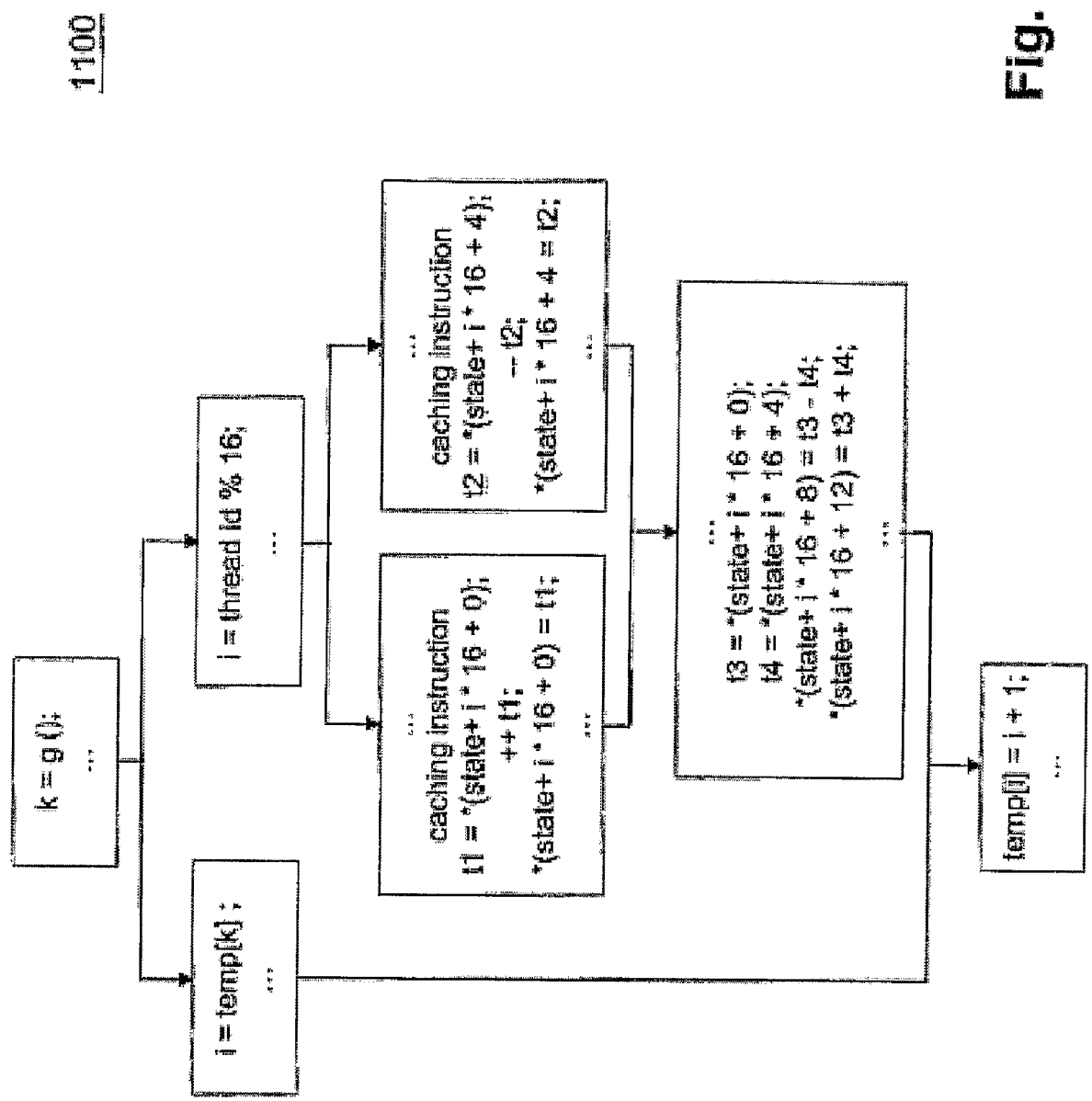
Figure 12:
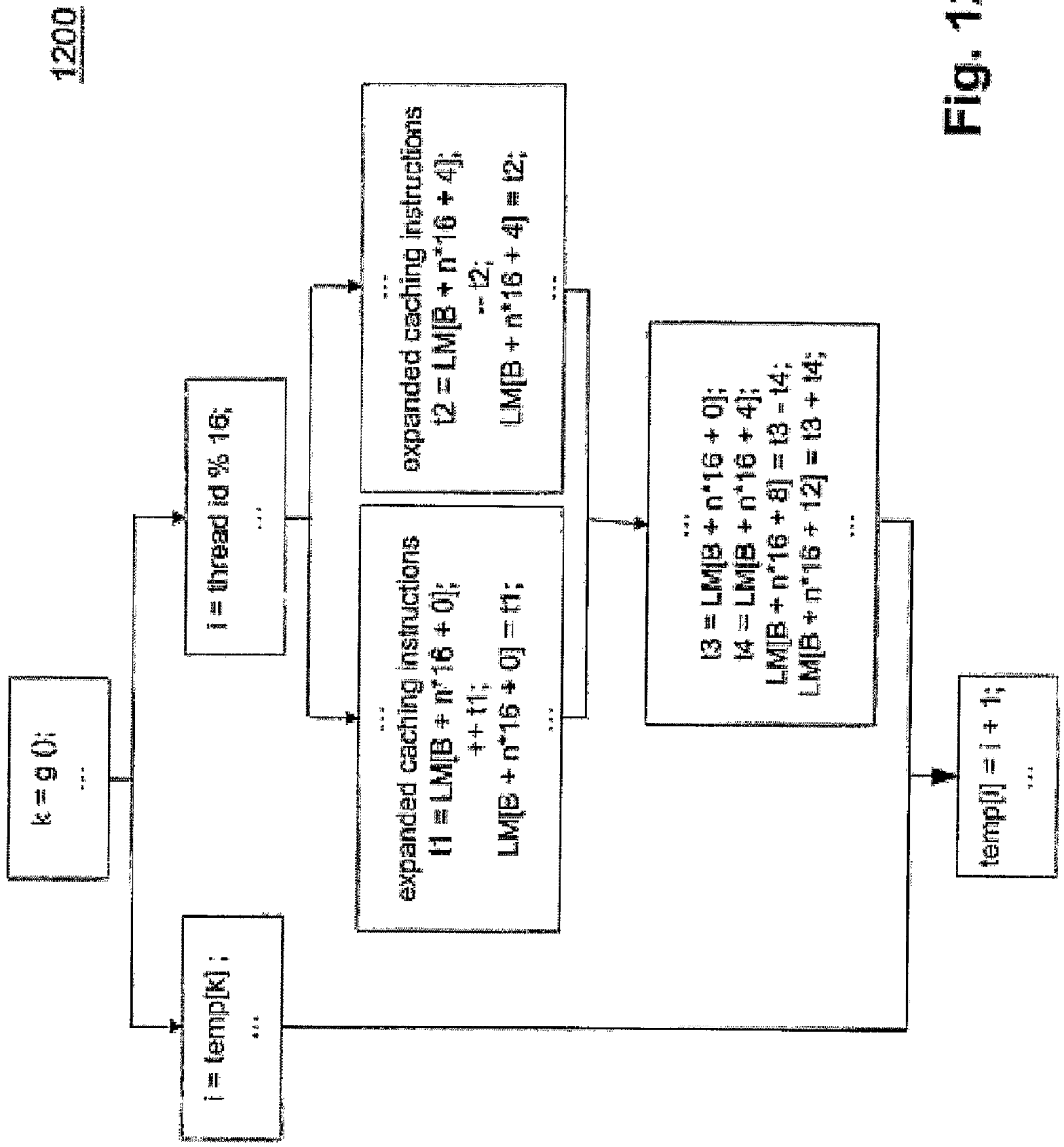

After the final candidate for caching is identified, one or more instructions are inserted into the corresponding instruction stream to maintain the CAM and LM units, and to modify the original accesses in the candidate to access the data image in LM. FIG. 10 is a block diagram illustrating an example of pseudo code that a caching instruction has been inserted before each external memory access instruction. In some cases, the inserted caching instructions may be duplicated and can be consolidated into one caching instruction per related external memory accesses, as shown in FIG. 11. Thereafter, the inserted caching instructions may be expanded to modify the external memory accesses to access the corresponding local memory instead of accessing external memory, as shown in FIG. 12. In this example, base=state+i*16, m=0, M=15 and n is the entry in CAM that contains the base.

Figure 13:
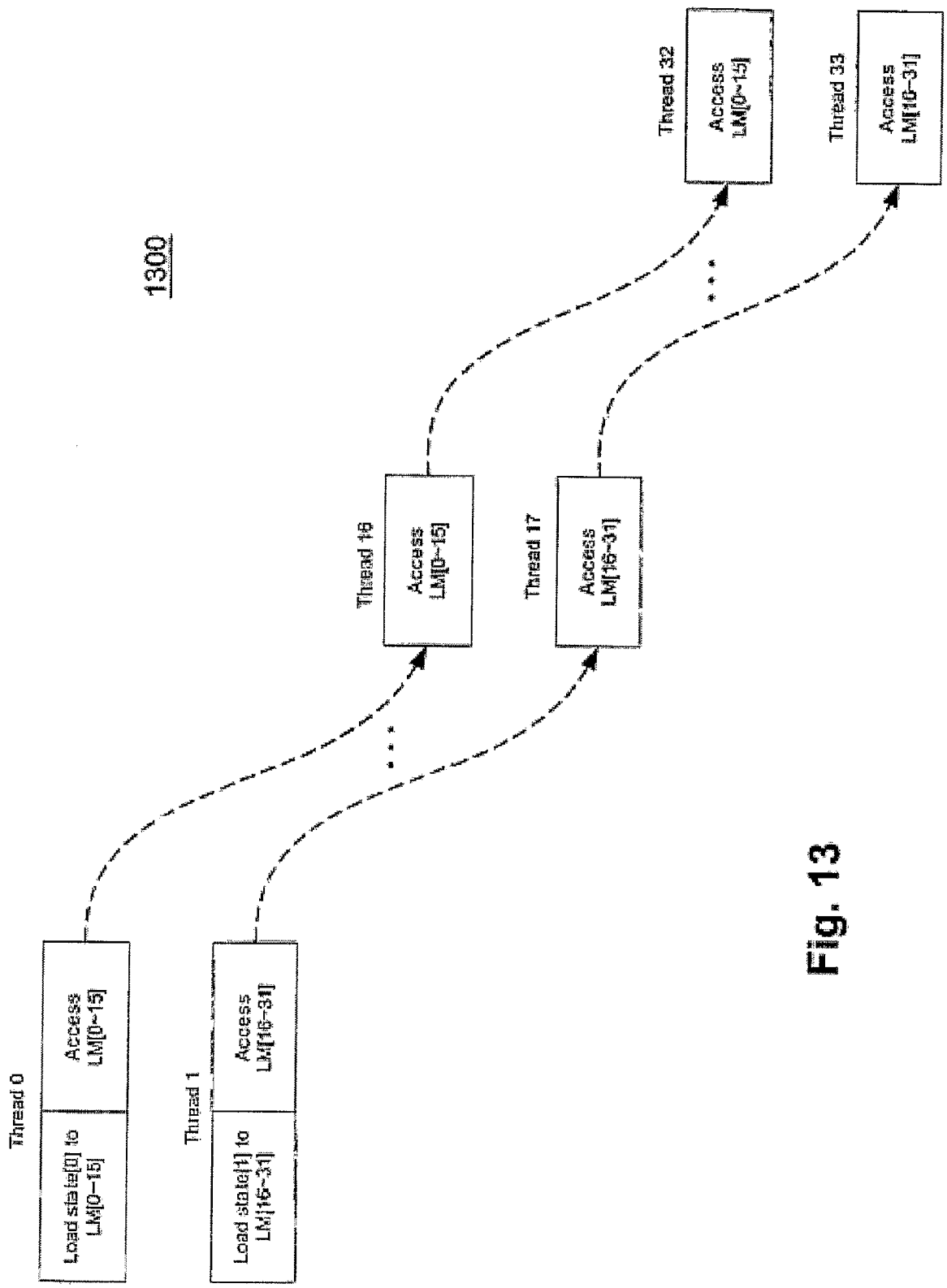
FIG. 13 is a block diagram illustrating an example of an external memory access using software controlled caching according to one embodiment.

Consequently, when different threads access the same data, they can directly access the data image in LM, as illustrated in FIG. 13 (assume the starting address B in LM is 0). In addition, some further optimizations may be performed. For example, in response to a CAM lookup miss, the expanded caching instructions could only write back the dirty bytes and load only the bytes actually used. Other operations may also be performed.

Figure 14:
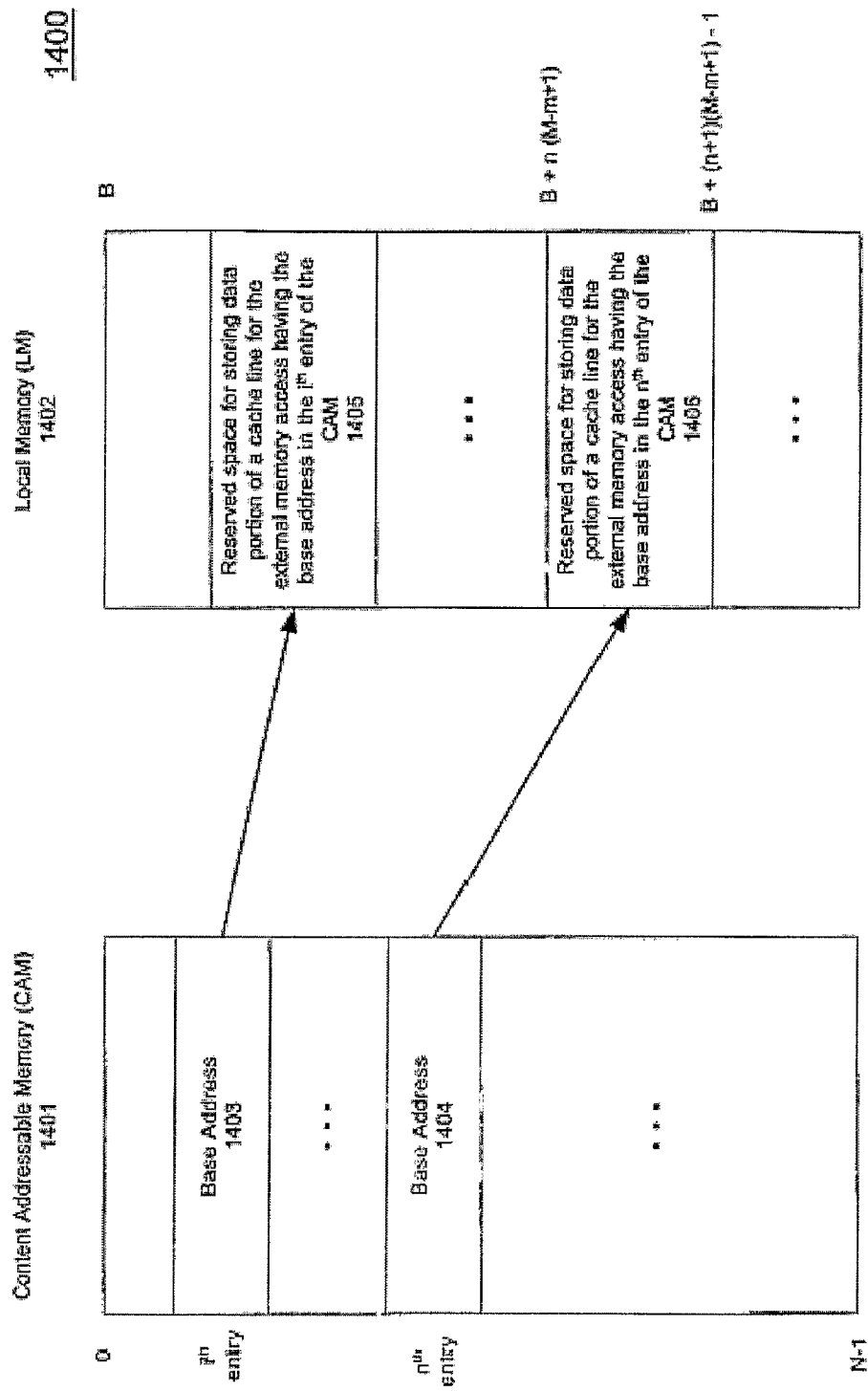
FIG. 14 is a block diagram illustrating an example of memory allocations of CAM and LM according to one embodiment.

In order to perform appropriate software controlled caching, sufficient local memory space has to be reserved for each external memory access. FIG. 14 is a block diagram illustrating an example of memory allocations of CAM and LM according to one embodiment. Referring to FIG. 14, memory configuration example 1400 includes a CAM 1401 and a local memory 1402. CAM 1401 includes one or more entries 1403-1404 which correspond to one or more memory spaces 1405-1406 respectively reserved.

For each the access in the candidate, its address is in the form of base+offset. For the purposes of illustrations, if m is the minimum address byte accessed and M is the maximum address byte accessed over all the accesses in the selected candidate (having $n^{th}$ entry of CAM 1401), and N is the number of entries in CAM, then N*(M−m+1) bytes may be reserved in LM 302 for the data image. Assume the stating address of the data images in LM 302 is B. If the base address of the candidate is stored in the $n^{th}$ entry 1404 in the CAM, where n is ranging from 0 to N−1, then the data portion of the associated cache line in LM 302 is from B+n*(M−m+1) to B+(n+1)*(M−m+1)−1, as indicated in memory space 1406.

Figure 15:
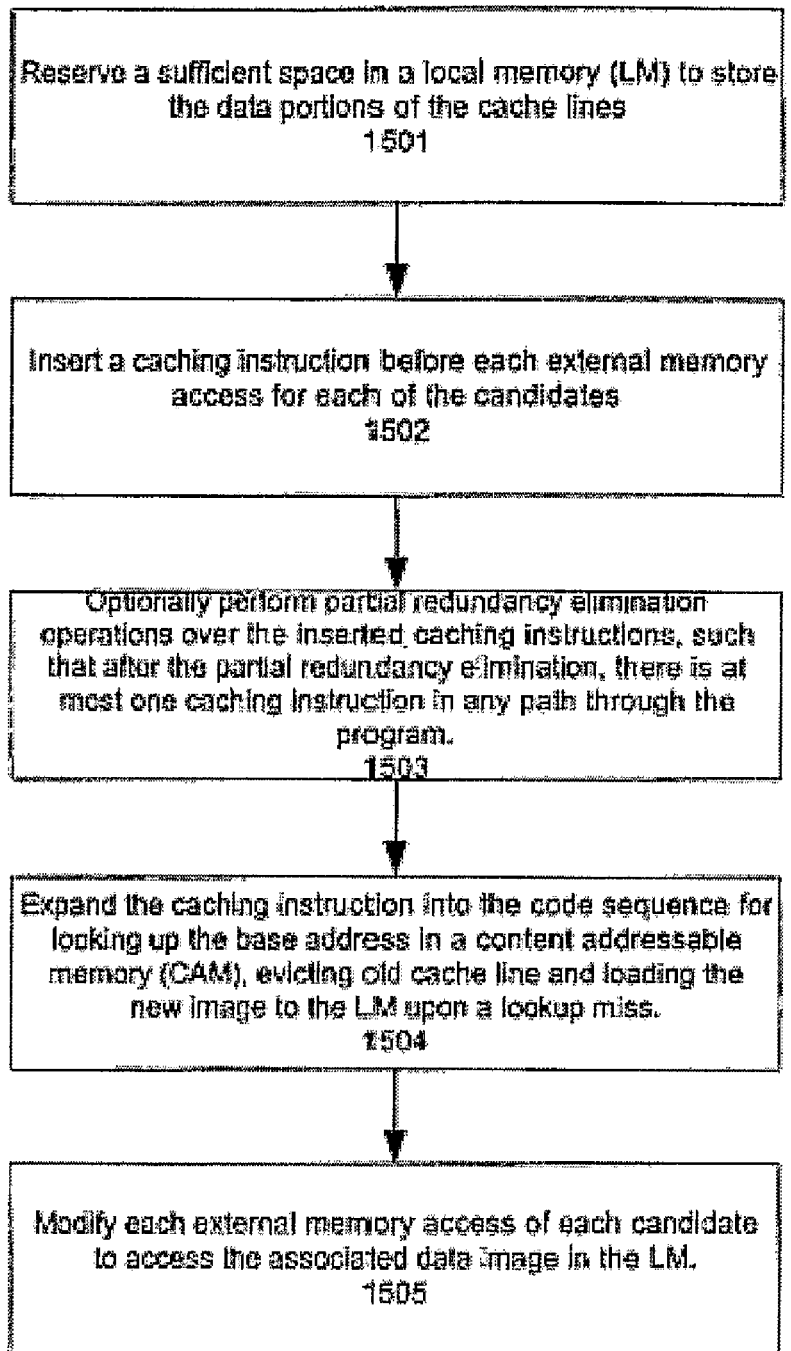
FIG. 15 is a flow diagram illustrating an example of a process for automatic software controlled caching according to one embodiment.

FIG. 15 is a flow diagram illustrating an example of a process for automatic software controlled caching according to one embodiment. Process example 1500 may be performed by a processing logic that may comprise hardware (circuitry, dedicated logic, etc.), software (such as is run on a dedicated machine), or a combination of both. For example, process example 1500 may be performed by a compiler when compiling source code written in a variety of programming languages, such as, for example, C/C++ and/or assembly.

Referring to FIG. 15, at block 1501, a sufficient memory space is reserved in a local memory to store the data portions of the cache lines of the external memory accesses. At block 1502, a caching instruction is inserted before each of the external memory access instruction for each candidate, as shown, for example, in FIG. 10. At block 1503, the processing logic optionally performs partial redundancy elimination operations over the inserted caching instructions, such that after the partial redundancy elimination, there is at most one caching instruction in any path through the program, as shown, for example, in FIG. 11. At block 1504, the caching instructions are expanded into one or more code sequences for looking up the base address in the CAM, evicting the old cache lines, and loading the new image to the LM upon a lookup miss in CAM, etc. At block 1505, each of the external memory accesses of each candidate is modified to access the associated data image in the LM. Note that all the instructions implementing the software controlled caching, including the expanded caching instructions and the modified accesses, should be protected by a critical section. Other operations may also be performed.

Figure 16:
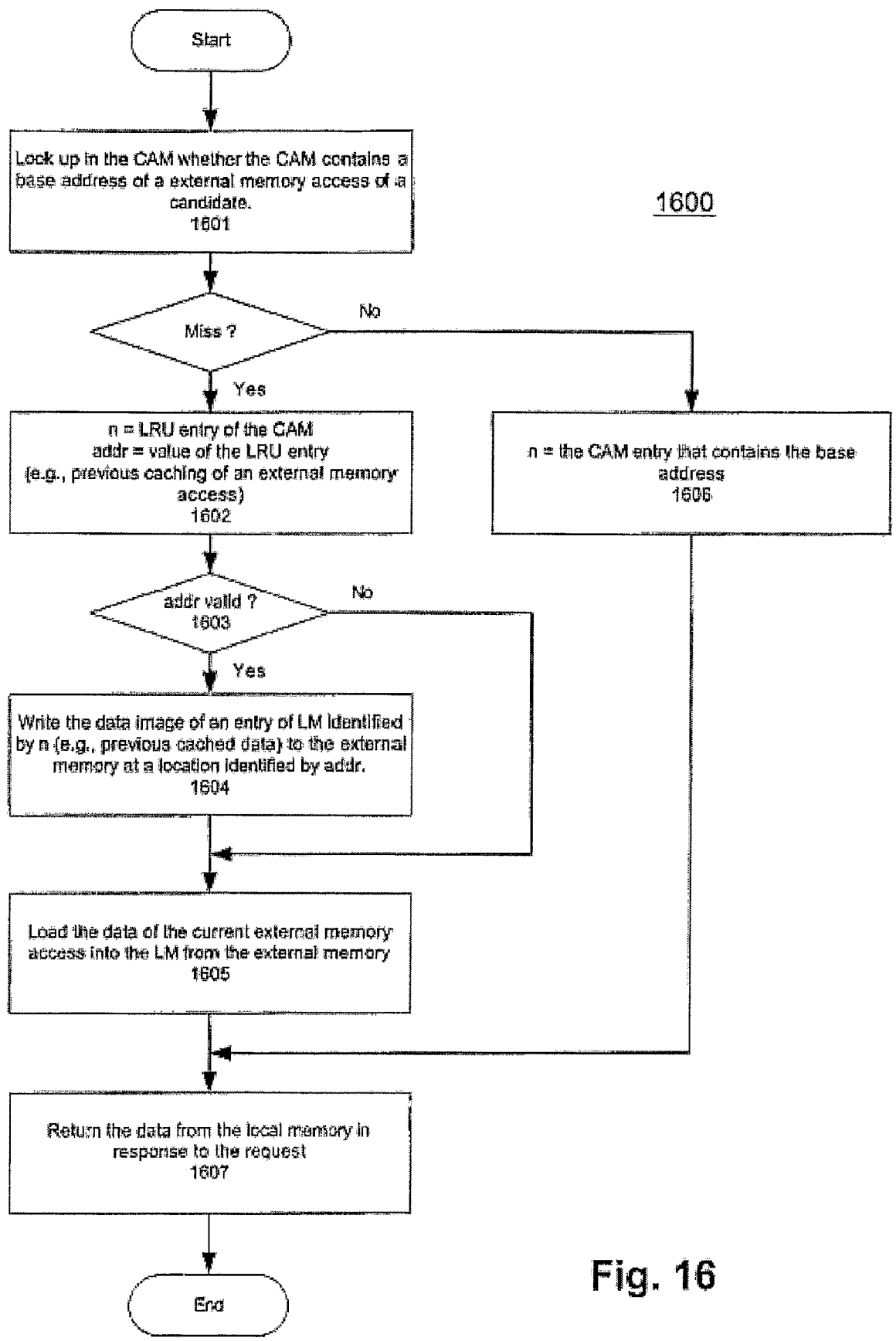
FIG. 16 is a flow diagram illustrating an example of a process for maintaining images of a CAM and/or LM within a microengine, according to one embodiment.

FIG. 16 is a flow diagram illustrating an example of a process for maintaining images of a CAM and/or LM within a microengine, according to one embodiment. Process example 1600 may be performed by a processing logic that may comprise hardware (circuitry, dedicated logic, etc.), software (such as is run on a dedicated machine), or a combination of both. For example, process example 1600 may be performed by a compiler when compiling source code written in a variety of programming languages, such as, for example, C/C++ and/or assembly. The process example 1600 may be performed as a part of operations performed at block 1504 of FIG. 15.

Referring to FIG. 16, when the processing logic receives a request to access an external memory location, at block 1601, the processing logic looks up in the CAM to determine whether the CAM contains a base address of the requested external memory access. If the CAM contains the base address of the requested external memory access (e.g., a hit), at block 1606, an index of the corresponding entry of the CAM that contains the base address is retrieved, and at block 1607, an entry of the LM is accessed based on the retrieved index without having to access the external memory.

If the CAM does not contains the base address of the requested external memory access (e.g., a miss), at block 1602, a least recently used (LRU) entry of the CAM is allocated or identified (e.g., an entry for previous caching operation of a previous external memory access), and the index and the address stored therein are retrieved. At block 1603, the retrieved address stored in the LRU entry of the CAM is examined to determine whether the address is valid.

If the address is determined to be valid, at block 1604, the data stored in the corresponding local memory (e.g., the previous cached data for a previous external memory access) is written back (e.g., swapped) into the external memory based on the identified valid address. Thus, the LRU entry of the CAM and the corresponding LM space are now available for caching the current external memory access. At block 1605, the data of the current memory access is loaded into the LRU entry of the CAM and the corresponding LM space from the external memory location identified by the base address. At block 1606, the data stored in the local memory is returned in response to the request. FIG. 17 is a block diagram of an example of pseudo code for the process example 1600 of FIG. 16. Other operations may also be performed.

Figure 18:
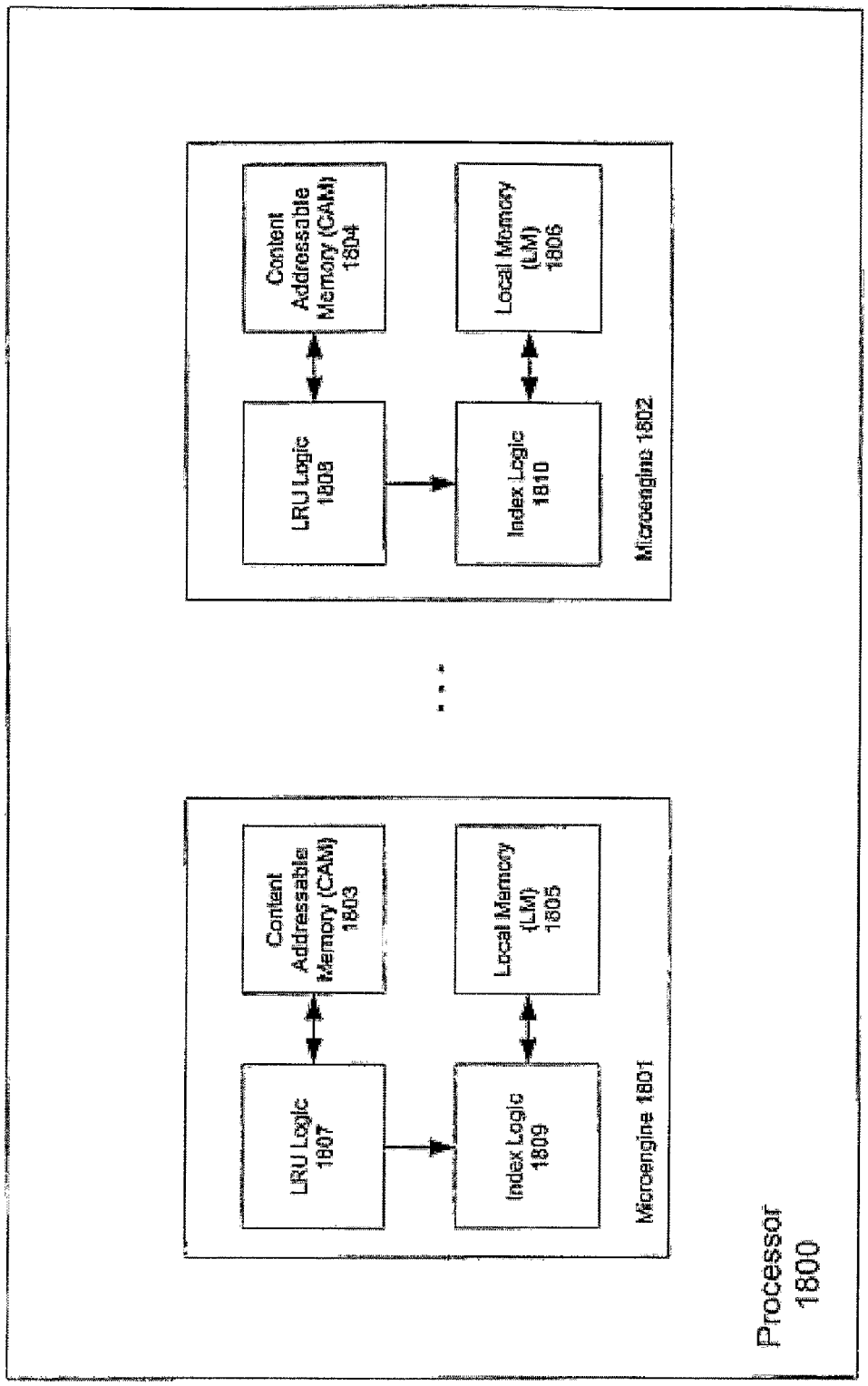
FIG. 18 is a block diagram of an example of a processor having multiple microengines according to one embodiment.

FIG. 18 is a block diagram of an example of a processor having multiple microengines according to one embodiment. The processor example 1800 includes multiple microengines 1801-1802. Each of the microengines 1801-1802 includes CAMs 1803-1804 respectively, which are managed by LRU logic 1807-1808 respectively. Each microengine further includes LMs 1805-1806 respectively, which are managed by index logic 1809-1810 respectively. The microengines 1801-1802 may be used to perform automatic software controlled caching operations described above, where each of the microengines may perform such operations for a respective thread substantially concurrently. It will be appreciated that some well-known components of a processor are not shown in order not to obscure embodiments of the invention in unnecessary detail.

Figure 19:
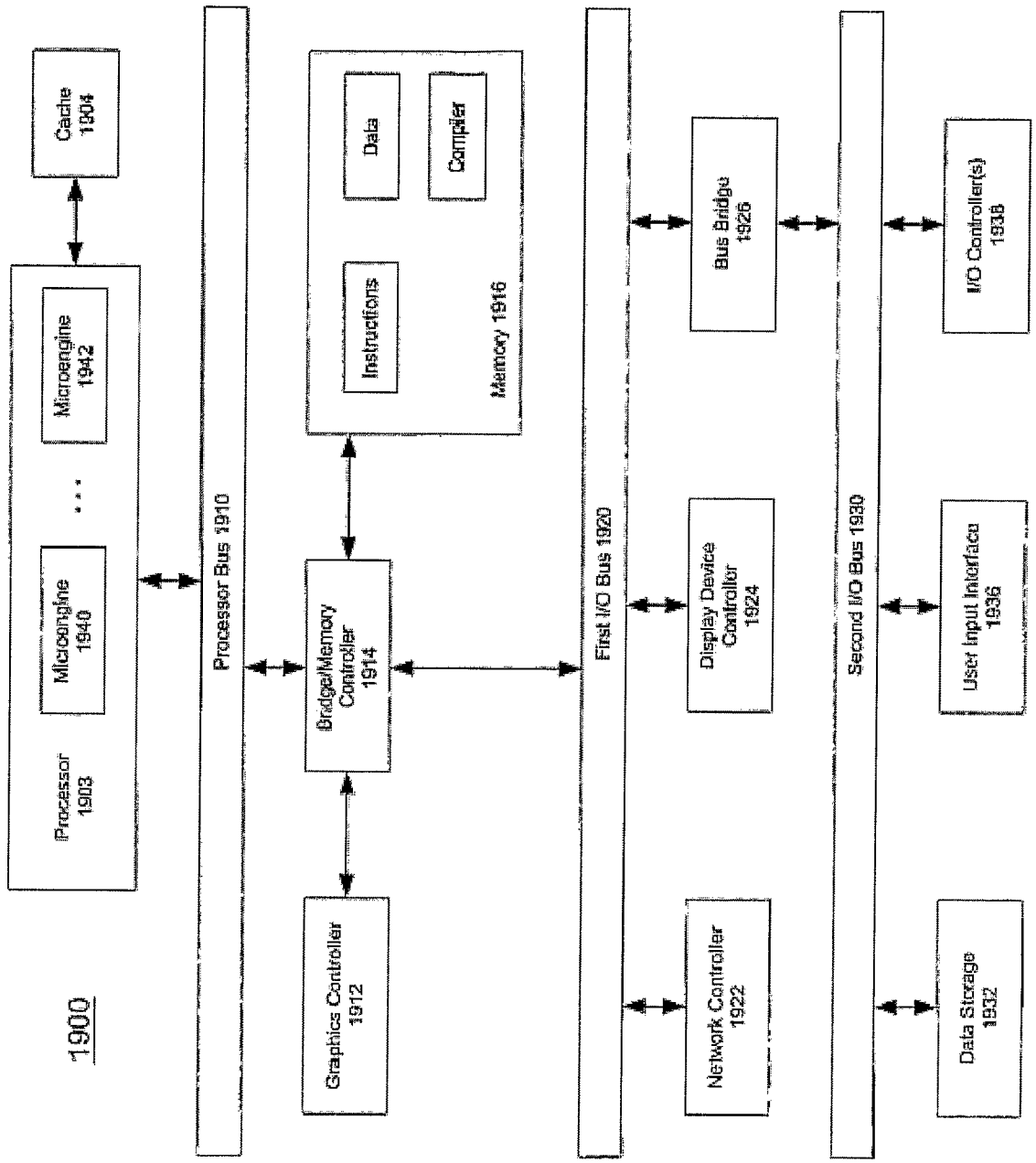
FIG. 19 is a block diagram illustrating an example of a data processing system according to one embodiment.

FIG. 19 is a block diagram illustrating an example of a data processing system according to one embodiment. The exemplary system 1900 may be used to perform the process examples for automatic software controlled caching described above. Note that while FIG. 19 illustrates various components of a computer system, it is not intended to represent any particular architecture or manner of interconnecting the components, as such details are not germane to the present invention. It will also be appreciated that network computers, handheld computers, cell phones, and other data processing systems, which have fewer components or perhaps more components, may also be used with the present invention. The computer system of FIG. 19 may, for example, be an Apple Macintosh computer or an IBM compatible PC.

Referring to FIG. 19, the computer system 1900 includes, but not limited to, a processor 1902 that processes data signals. Processor 1902 may be an exemplary processor 100 illustrated in FIG. 1. The processor 1902 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 19 shows an example of an embodiment of the present invention implemented as a single processor system 1900. However, it is understood that embodiments of the present invention may alternatively be implemented as systems having multiple processors. Processor 1902 may be coupled to a processor bus 1910 that transmits data signals between processor 1902 and other components in the system 1900.

In one embodiment, processor 1902 includes, but not limited to, multiple microengines 1940-1942. The microengines 1940-1942 may be used to perform automatic software controlled caching for multiple threads substantially concurrently.

In addition, system 1900 includes a memory 1916. Memory 1916 may be a dynamic random access memory (DRAM) device, a static random access memory (SRAM) device, or other memory device. Memory 1916 may store instructions and/or data represented by data signals that may be executed by processor 1902. The instructions and/or data may include code for performing any and/or all of the techniques of the present invention. A compiler for compiling source code, including identifying one or more candidates suitable for software controlled caching, and inserting and expanding caching instructions to access the local memory rather than the external memory. Memory 1916 may also contain additional software and/or data not shown. A cache memory 1904 may reside inside or outside the processor 1902 that stores data signals stored in memory 1916. Cache memory 1904 in this embodiment speeds up memory accesses by the processor by taking advantage of its locality of access.

Further, a bridge/memory controller 1914 may be coupled to the processor bus 1910 and memory 1916. The bridge/memory controller 1914 directs data signals between processor 1902, memory 1916, and other components in the system 1900 and bridges the data signals between processor bus 1910, memory 1916, and a first input/output (I/O) bus 1920. In some embodiments, the bridge/memory controller provides a graphics port for coupling to a graphics controller 1912. In this embodiment, graphics controller 1912 interfaces to a display device for displaying images rendered or otherwise processed by the graphics controller 1912 to a user. The display device may include a television set, a computer monitor, a flat panel display, or other suitable display devices.

First I/O bus 1920 may include a single bus or a combination of multiple buses. First I/O bus 1920 provides communication links between components in system 1900. A network controller 1922 may be coupled to the first I/O bus 1920. The network controller links system 1900 to a network that may include a plurality of processing system and supports communication among various systems. The network of processing systems may include a local area network (LAN), a wide area network (WAN), the Internet, or other network. A compiler for compiling source code can be transferred from one computer to another system through a network. Similarly, compiled code that includes the directives or instruction inserted by the compiler can be transferred from a host machine (e.g., a development machine) to a target machine (e.g., an execution machine).

In some embodiments, a display device controller 1924 may be coupled to the first I/O bus 1920. The display device controller 1924 allows coupling of a display device to system 1900 and acts as an interface between a display device and the system. The display device may comprise a television set, a computer monitor, a flat panel display, or other suitable display device. The display device receives data signals from processor 1902 through display device controller 1924 and displays information contained in the data signals to a user of system 1900.

A second I/O bus 1930 may comprise a single bus or a combination of multiple buses. The second I/O bus 1930 provides communication links between components in system 1900. A data storage device 1932 may be coupled to second I/O bus 1930. The data storage device 1932 may include a hard disk drive, a floppy disk drive, a CD-ROM device, a flash memory device, or other mass storage devices. Data storage device 1932 may include one or a plurality of the described data storage devices.

A user input interface 1934 may be coupled to the second I/O bus 1930, such as, for example, a keyboard or a pointing device (e.g., a mouse). The user input interface 1934 may include a keyboard controller or other keyboard interface device. The user input interface 1934 may include a dedicated device or may reside in another device such as a bus controller or other controller device. The user input interface 1934 allows coupling of a user input device (e.g., a keyboard, a mouse, joystick, or trackball, etc.) to system 1900 and transmits data signals from a user input device to system 1900.

One or more I/O controllers 1938 may be used to connect one or more I/O devices to the exemplary system 1900. For example, the I/O controller 1938 may include a USB (universal serial bus) adapter for controlling USB peripherals or alternatively, an IEEE 1394 (also referred to as Firewire) bus controller for controlling IEEE 1394 compatible devices.

Furthermore, the elements of system 1900 perform their conventional functions well-known in the art. In particular, data storage device 1932 may be used to provide long-term storage for the executable instructions and data structures for embodiments of methods of dynamic loop aggregation in accordance with embodiments of the present invention, whereas memory 1916 is used to store on a shorter term basis the executable instructions of embodiments of the methods of dynamic loop aggregation in accordance with embodiments of the present invention during execution by processor 1902.

Although the above example describes the distribution of computer code via a data storage device, program code may be distributed by way of other computer readable mediums. For instance, a computer program may be distributed through a computer readable medium such as a floppy disk, a CD ROM, a carrier wave, a network, or even a transmission over the Internet. Software code compilers often use optimizations during the code compilation process in an attempt to generate faster and better code.

Thus, automatic software controlled caching generations in network applications have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
identifying a candidate representing a plurality of instructions of a plurality of threads that perform one or more external memory accesses, the one or more external memory accesses having an identical base address, including
partitioning the plurality of instructions of the external memory accesses into one or more sets of potential candidates based on dependency relationships of the instructions,
converting addresses of each external memory accesses into a form having a base address and an offset,
grouping multiple potential candidates having the identical base address into a single candidate, wherein a group having most of the potential candidates is selected as a final candidate for caching, and
selecting one of the potential candidate sets as the candidate, instructions of the candidate satisfying a predetermined dependency relationship; and
inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

2. The method of claim 1, wherein the base address is a non-constant part and the offset is a constant part of the converted address.

3. The method of claim 1, wherein the identifying the candidate further comprises:
performing a copy-forward transformation on addresses of each of the external memory accesses; and
performing at least one of a global value numbering operation and a constant folding operation for each thread.

4. A computer-implemented method, comprising:
identifying a candidate representing a plurality of instructions of a plurality of threads that perform one or more external memory accesses, the one or more external memory accesses having an identical base address, including
partitioning the plurality of instructions of the external memory accesses into one or more sets of potential candidates based on dependency relationships of the instructions,
converting addresses of each external memory accesses into a form having a base address and an offset,
screening out one or more ineligible candidates from the potential candidates, wherein the ineligible candidates include a base address that is different from a remainder of the potential candidates, and
selecting one of the potential candidate sets as the candidate, instructions of the candidate satisfying a predetermined dependency relationship,
inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

5. A computer-implemented method, comprising:
identifying a candidate representing a plurality of instructions of a plurality of threads that perform one or more external memory accesses, the one or more external memory accesses having an identical base address, including
partitioning the plurality of instructions of the external memory accesses into one or more sets of potential candidates based on dependency relationships of the instructions,
converting addresses of each external memory accesses into a form having a base address and an offset, and
selecting one of the potential candidate sets as the candidate, instructions of the candidate satisfying a predetermined dependency relationship; and
inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access, including
for each thread, reserving a sufficient space in the local memory to store data portions of cache lines, and
inserting a caching instruction prior to each of the external memory accesses.

6. The method of claim 5, further comprising seeking the base address of each external memory access in the CAM to determine whether the CAM includes an entry that contains the base address being sought.

7. The method of claim 6, wherein if the CAM includes an entry containing the base address being sought, the method further comprises:
determining an offset of the local memory based on the entry of the CAM containing the base address being sought; and
accessing data from an entry of the local memory referenced by the determined offset.

8. The method of claim 6, wherein if the CAM does not includes an entry containing the base address being sought, the method further comprises allocating a least recently used (LRU) entry of the CAM having a base address of a previous external memory access.

9. The method of claim 8, further comprising:
loading data of a current external memory access from the external memory into an entry of the local memory referenced by the allocated LRU entry; and
storing the base address of the current external memory access in the LRU entry of the CAM replacing the base address of the previous external memory access.

10. The method of claim 8, further comprising:
examining the base address of the previous external memory access in the allocated LRU entry to determine whether the base address is valid; and
replicating data of an entry in the local memory corresponding to the allocated LRU entry to a location of the external memory based address of the previous external memory access.

11. A machine-readable storage medium having executable code to cause a machine to perform a method, the method comprising:
identifying a candidate representing a plurality of instructions of a plurality of threads that perform one or more external memory accesses, the one or more external memory accesses having an identical base address, including
partitioning the plurality of instructions of the external memory accesses into one or more sets of potential candidates based on dependency relationships of the instructions,
converting addresses of each external memory accesses into a form having a base address and an offset,
grouping multiple potential candidates having the identical base address into a single candidate, wherein a group having most of the potential candidates is selected as a final candidate for caching, and
selecting one of the potential candidate sets as the candidate, instructions of the candidate satisfying a predetermined dependency relationship; and
inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

12. A machine-readable storage medium having executable code to cause a machine to perform a method, the method comprising:
identifying a candidate representing a plurality of instructions of a plurality of threads that perform one or more external memory accesses, the one or more external memory accesses having an identical base address, including
partitioning the plurality of instructions of the external memory accesses into one or more sets of potential candidates based on dependency relationships of the instructions,
converting addresses of each external memory accesses into a form having a base address and an offset,
screening out one or more ineligible candidates from the potential candidates, wherein the ineligible candidates include a base address that is different from a remainder of the potential candidates, and selecting one of the potential candidate sets as the candidate, instructions of the candidate satisfying a predetermined dependency relationship, inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

13. A machine-readable storage medium having executable code to cause a machine to perform a method, the method comprising:

identifying a candidate representing a plurality of instructions of a plurality of threads that perform one or more external memory accesses, the one or more external memory accesses having an identical base address, including partitioning the plurality of instructions of the external memory accesses into one or more sets of potential candidates based on dependency relationships of the instructions, convening addresses of each external memory accesses into a form having a base address and an offset, and selecting one of the potential candidate sets as the candidate, instructions of the candidate satisfying a predetermined dependency relationship; and inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access, including for each thread, reserving a sufficient space in the local memory to store data portions of cache lines, and inserting a caching instruction prior to each of the external memory accesses.

14. The machine-readable storage medium of claim 13, wherein the method further comprises seeking the base address of each external memory access in the CAM to determine whether the CAM includes an entry that contains the base address being sought.

15. The machine-readable storage medium of claim 14 wherein if the CAM includes an entry containing the base address being sought, the method further comprises:

determining an offset of the local memory based on the entry of the CAM containing the base address being sought; and accessing data from an entry of the local memory referenced by the determined offset.

16. The machine-readable storage medium of claim 14, wherein if the CAM does not includes an entry containing the base address being sought, the method further comprises allocating a least recently used (LRU) entry of the CAM having a base address of a previous external memory access.

17. The machine-readable storage medium of claim 16, wherein the method further comprises:

loading data of a current external memory access from the external memory into an entry of the local memory referenced by the allocated LRU entry; and storing the base address of the current external memory access in the LRU entry of the CAM replacing the base address of the previous external memory access.

18. The machine-readable storage medium of claim 16, wherein the method further comprises:

examining the base address of the previous external memory access in the allocated LRU entry to determine whether the base address is valid; and replicating data of an entry in the local memory corresponding to the allocated LRU entry to a location of the external memory based address of the previous external memory access.

19. A data processing system, comprising:

a processor; and a memory for storing instructions, which when executed from the memory, cause the processor to perform operations, including identifying a candidate representing a plurality of instructions of a plurality of threads that perform one or more external memory accesses, the one or more external memory accesses having an identical base address, including partitioning the plurality of instructions of the external memory accesses into one or more sets of potential candidates based on dependency relationships of the instructions, converting addresses of each external memory accesses into a form having a base address and an offset, grouping multiple potential candidates having the identical base address into a single candidate, wherein a group having most of the potential candidates is selected as a final candidate for caching, and selecting one of the potential candidate sets as the candidate, instructions of the candidate satisfying a predetermined dependency relationship; and inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

20. A data processing system, comprising:

a processor; and a memory for storing instructions, which when executed from the memory, cause the processor to perform operations, including identifying a candidate representing a plurality of instructions of a plurality of threads that perform one or more external memory accesses, the one or more external memory accesses having an identical base address, including partitioning the plurality of instructions of the external memory accesses into one or more sets of potential candidates based on dependency relationships of the instructions, converting addresses of each external memory accesses into a form having a base address and an offset, screening out one or more ineligible candidates from the potential candidates, wherein the ineligible candidates include a base address that is different from a remainder of the potential candidates, and selecting one of the potential candidate sets as the candidate, instructions of the candidate satisfying a predetermined dependency relationship, inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access.

21. A data processing system, comprising:

a processor; and a memory for storing instructions, which when executed from the memory, cause the processor to perform operations, including identifying a candidate representing a plurality of instructions of a plurality of threads that perform one or more external memory accesses, the one or more external memory accesses having an identical base address, including partitioning the plurality of instructions of the external memory accesses into one or more sets of potential candidates based on dependency relationships of the instructions, converting addresses of each external memory accesses into a form having a base address and an offset, and selecting one of the potential candidate sets as the candidate, instructions of the candidate satisfying a predetermined dependency relationship; and inserting at least one of directives and instructions into an instruction stream corresponding to the identified candidate to maintain contents of at least one of a content addressable memory (CAM) and local memory (LM) of a processor and to modify at least one of the external memory accesses to access at least one of the CAM and LM of the processor without having to perform the respective external memory access, including for each thread, reserving a sufficient space in the local memory to store data portions of cache lines, and inserting a caching instruction prior to each of the external memory accesses.

* * * * *

UNITED STATES PATENT AND TRADEMARK OFFICE
CERTIFICATE OF CORRECTION

PATENT NO.       : 7,606,974 B2                                              Page 1 of 1
APPLICATION NO.  : 10/589398
DATED            : October 20, 2009
INVENTOR(S)      : Dai et al.

It is certified that error appears in the above-identified patent and that said Letters Patent is hereby corrected as shown below:

In column 15, at line 24 delete, "convening" and insert -- converting --.

Signed and Sealed this

Fifteenth Day of June, 2010

David J. Kappos
*Director of the United States Patent and Trademark Office*